US012801413B2

(12) United States Patent
Lev Ran et al.

(10) Patent No.: US 12,801,413 B2
(45) Date of Patent: Nov. 17, 2026

(54) NETWORK INTERFACE CARD HAVING VARIABLE SIZED VIRTUAL FUNCTIONS

(71) Applicant: International Business Machines Corporation, Armonk, NY (US)

(72) Inventors: Etai Lev Ran, Etai (IL); Dean Har'el Lorenz, Haifa (IL); Liran Schour, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/930,740

(22) Filed: Sep. 9, 2022

(65) Prior Publication Data

US 2024/0086217 A1 Mar. 14, 2024

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC .................................................. G06F 9/45558
USPC ............................................................. 718/1
See application file for complete search history.

(56) References Cited

U.S. PATENT DOCUMENTS 9,535,740 B1 * 1/2017 Graham .............. G06F 9/45558
2012/0131590 A1 * 5/2012 Brownlow ............ G06F 9/5077 718/104
2013/0042086 A1 * 2/2013 Cardona ............. G06F 12/0284 711/E12.002
2014/0208318 A1 * 7/2014 Zhang ................. G06F 9/45533 718/1
2016/0077884 A1 * 3/2016 Hunter .................. G06F 9/4411 718/104
2016/0170789 A1 * 6/2016 Anand ................ G06F 9/45558 718/1
2016/0203027 A1 * 7/2016 Challa ................ G06F 9/45558 718/1
2016/0328342 A1 * 11/2016 Kim .................... G06F 9/45533
2017/0093677 A1 * 3/2017 Skerry .................... H04L 43/20
2017/0104688 A1 * 4/2017 Mirahsan ............ H04L 41/0896
2017/0220366 A1 * 8/2017 Crowe ................ G06F 9/45558
2017/0269952 A1 * 9/2017 Graham .............. G06F 9/45558
2017/0286145 A1 * 10/2017 Anand ................ G06F 9/45558
2017/0310609 A1 * 10/2017 Kim ........................ H04L 41/06
2018/0123939 A1 * 5/2018 Raman .................. H04L 47/828
2018/0349202 A1 * 12/2018 Sharma ............... H04L 41/0897
2019/0044828 A1 * 2/2019 Gasparakis ............. H04L 41/40

(Continued)

OTHER PUBLICATIONS

Adam et al. "Introduction to Virtio-Networking and Vhost-Net", Red Hat Blog, Sep. 9, 2019, 14 pages.
No Author. "Ethernet Network Adapters and Controllers", retrieved from wayback machine, Dec 8, 2020, 8 pages.
No Author. "Ethernet NICs and Controllers", Marvell, Jun. 2021, 7 pages.

(Continued)

*Primary Examiner* — Mehran Kamran
(74) *Attorney, Agent, or Firm* — Tihon Poltavets; Cantor Colburn LLP

(57) ABSTRACT

According to an aspect, a network interface card having a processor, a set of resources, and a plurality of virtual functions is provided. Each virtual function of the network interface card is configured to provide network access to a workload. The processor of the network interface card is configured to allocate the set of resources among the plurality of virtual functions, and wherein the allocation of the set of resources is non-uniform across the plurality of virtual functions.

20 Claims, 4 Drawing Sheets

(56) References Cited

U.S. PATENT DOCUMENTS

| | | | | |
|---|---|---|---|---|
| 2019/0114195 | A1* | 4/2019 | Jani | G06F 11/2007 |
| 2020/0012509 | A1* | 1/2020 | Khan | G06F 9/45558 |
| 2020/0044919 | A1* | 2/2020 | Yao | H04L 41/0806 |
| 2020/0097310 | A1* | 3/2020 | Shukla | G06F 9/5077 |
| 2020/0356402 | A1* | 11/2020 | Zhang | G06F 9/5077 |
| 2021/0377185 | A1* | 12/2021 | Durrani | H04L 47/80 |
| 2022/0104127 | A1* | 3/2022 | Subramaniam | H04W 52/0222 |
| 2022/0114032 | A1* | 4/2022 | Guim Bernat | H04L 67/1001 |
| 2022/0182328 | A1* | 6/2022 | Valancius | H04L 47/20 |
| 2022/0191602 | A1* | 6/2022 | Herdrich | H04L 41/5009 |
| 2022/0206831 | A1* | 6/2022 | Chander | G06F 9/45558 |
| 2022/0210220 | A1* | 6/2022 | Shivanna | H04L 67/1008 |
| 2022/0222117 | A1* | 7/2022 | Kutch | G06F 9/5005 |
| 2022/0291875 | A1* | 9/2022 | Diaz-Cuellar | G06F 9/455 |
| 2023/0071976 | A1* | 3/2023 | Lee | G06F 11/301 |
| 2023/0315295 | A1* | 10/2023 | Chandrashekaraiah | G06F 3/0683 |
| 2024/0086217 | A1* | 3/2024 | Lev Ran | G06F 9/45558 |
| 2024/0134701 | A1* | 4/2024 | Xia | G06F 9/45558 |
| 2024/0311175 | A1* | 9/2024 | Xie | G06F 9/45558 |

OTHER PUBLICATIONS

No Author. “Linux base driver for Intel (R) Ethernet adaptive virtual function”, Vendors device Drivers, Jun. 12, 2021, 8 pages.

Santos et al. “Taming Heterogeneous NIC Capabilities for I/O Virtualization”, Usenix, Nov. 6, 2008, 10 pages.

Wikipedia. “Virtual Memory”, retrieved from wayback machine, Jul. 18, 2022, 10 pages.

Anonymous, “Enhancing Scalability Through NIC Switch Independent Partitioning.” https://www.marvell.com/content/dam/marvell/en/public-collateral/ethernet-adaptersandcontrollers/marvell-ethernet-adapters-fastlinq-3400-8400-enhancing-scalability-nic-switch-independent-partitioning-white-paper.pdf Marvell White Papers, Nov. 2020. 6 Pages.

Zhiyong Ye et al., “A Virtual Network Resource Allocation Framework Based on SR-IOV.” Appl. Sciences 2019, vol. 9 (1). https://www.mdpi.com/2076-3417/9/1/137. Jan. 2, 2019. 19 Pages.

Zeidner, “QSG: High Availability with Mellanox ASAP2 Enhanced SR-IOV (VF-LAG)”, Solutions—Nvidia Networking Docs, 2022, 7p.

* cited by examiner

NETWORK INTERFACE CARD HAVING VARIABLE SIZED VIRTUAL FUNCTIONS

BACKGROUND

The present invention generally relates to computer systems, and more specifically, to computer systems, computer-implemented methods, and computer program products for operating a network interface card having variable sized virtual functions.

In general, a network interface card (NIC) provides a computer system with a connection to a network. NICs implement the physical layer circuitry necessary for communicating with a data link layer standard, such as Ethernet. The NIC is configured to prepare, transmit and control the flow of data on the network.

Recently, NICs have been developed for computing systems having multiple virtual machines that expose multiple virtual functions to the computer system. These virtual functions allow a single NIC to support the operation of multiple virtual machines by associating a virtual machine with one of the virtual functions, which appears to the virtual machine as a dedicated NIC.

SUMMARY

Embodiments of the present invention are directed to a network interface card having a processor, a set of resources, and a plurality of virtual functions. Each virtual function is configured to provide network access to a workload and the processor is configured to allocate the set of resources among the plurality of virtual functions, and wherein the allocation of the set of resources is non-uniform across the plurality of virtual functions.

Embodiments of the present invention are directed to a computer-implemented method. According to an aspect, a computer-implemented method includes receiving, by a network interface card, a connection request for a workload and obtaining, by the network interface card, a workload requirement based on the connection request. The computer-implemented method also includes assigning, by the network interface card, a virtual function to the workload, wherein a size of the virtual function is based at least in part on the workload requirement.

Embodiments of the present invention are directed to a computer-implemented method. According to an aspect, a computer-implemented method includes receiving, by a shared computing resource, a connection request for a workload and assigning, by the shared computing resource, a virtual function to the workload, wherein a size of the virtual function is set to an initial value. The computer-implemented method also includes monitoring, by the shared computing resource, a utilization rate of one or more resources assigned to the virtual function and changing the size of the virtual function based at least in part on a determination the utilization rate of the virtual function is outside of a threshold range, which is between a first threshold value and a second threshold value.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
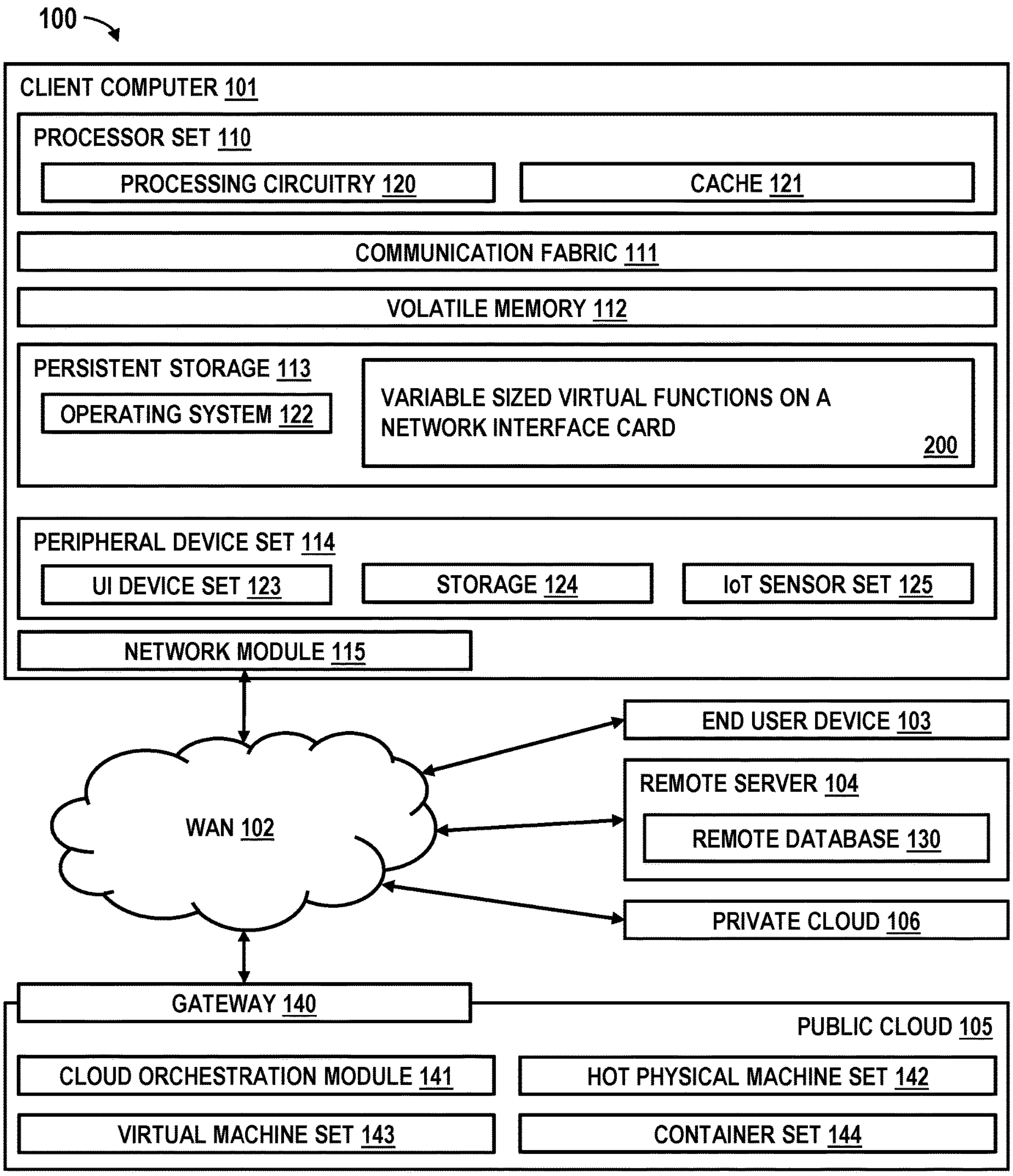
FIG. 1 depicts a block diagram of an example computer system for use in conjunction with one or more embodiments of the present invention.

As discussed above, network interface cards (NICs) having multiple virtual functions have previously been developed for computing systems having multiple virtual machines. In currently available NICs having multiple virtual functions, the number of virtual functions is a predetermined number based on the operating mode of the NIC and each of the virtual functions is allocated a predetermined amount of resources of the NIC. For example, a NIC may include eight virtual functions and each of the virtual functions is allocated one-eighth of the available resources of the NIC.

One or more embodiments of the present invention include methods, systems, and computer program products for operating a network interface card (NIC) having variable sized virtual functions. In exemplary embodiments, a NIC is provided that includes multiple virtual functions that have unequal sizes. As used herein, the size of a virtual function of a NIC refers to a relative amount of the resources of the NIC that are assigned to the virtual function. In general, the resources of a NIC include a transmission buffer, a bandwidth of the NIC, flow table entries, and the like.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the provisioning of variable sized virtual functions in a network interface card 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In exemplary embodiments, a network interface card (NIC) having multiple variable sized virtual functions and methods for operating the same are provided. In exemplary embodiments, the NIC includes a set of resources, such as buffer space, transmission bandwidth, flow table entries, etc., that are shared across multiple virtual functions. The resources are allocated to the multiple virtual functions based on a size of the virtual function, such that at least two of the virtual functions have a different amount of resources allocated thereto.

Figure 3:
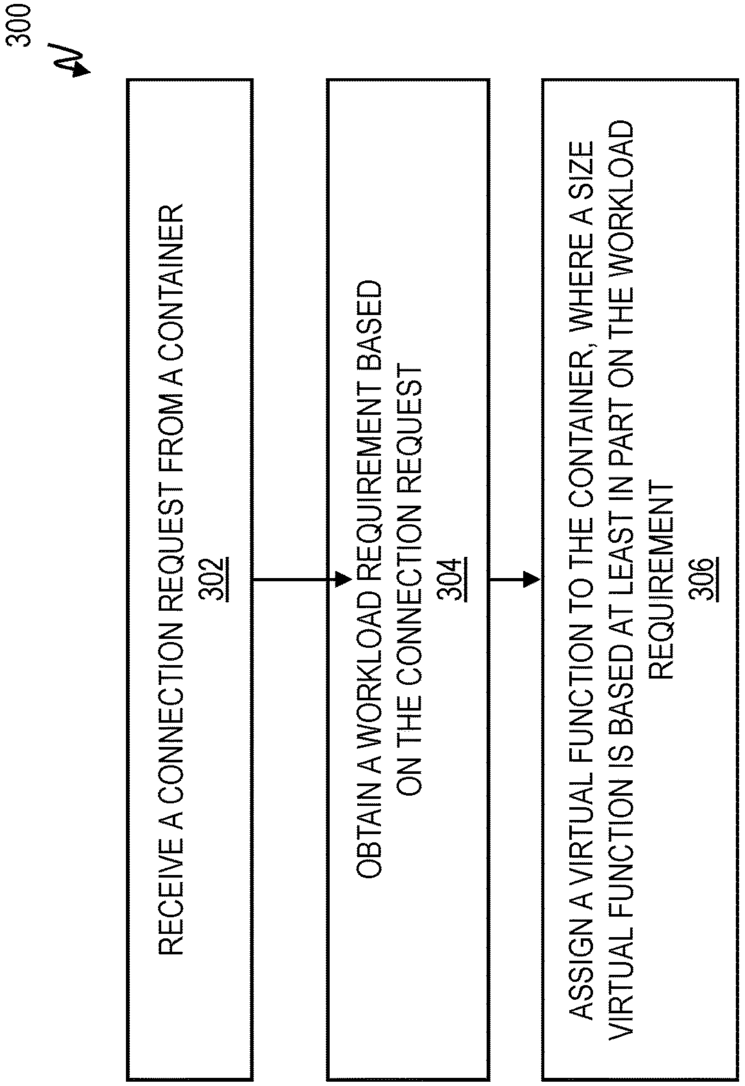
FIG. 3 is a flowchart of a method for operating a network interface card having variable sized virtual functions in accordance with one or more embodiments of the present invention.

In one embodiment, discussed herein in more detail with reference to FIG. 3, the NIC is configured to assign a workload to a virtual function based on a workload requirement of the workload. As a result, workloads that have higher workload requirements will be assigned to a virtual function having more resources associated with it, and workloads that have lower workload requirements will be assigned to a virtual function having fewer resources associated with it. In another embodiment, discussed herein in more detail with reference to FIG. 4, the NIC is configured to dynamically vary the size of the VF assigned to a workload, or a virtual machine, based on the consumption of the workload and the availability of additional resources on the NIC.

Figure 2:
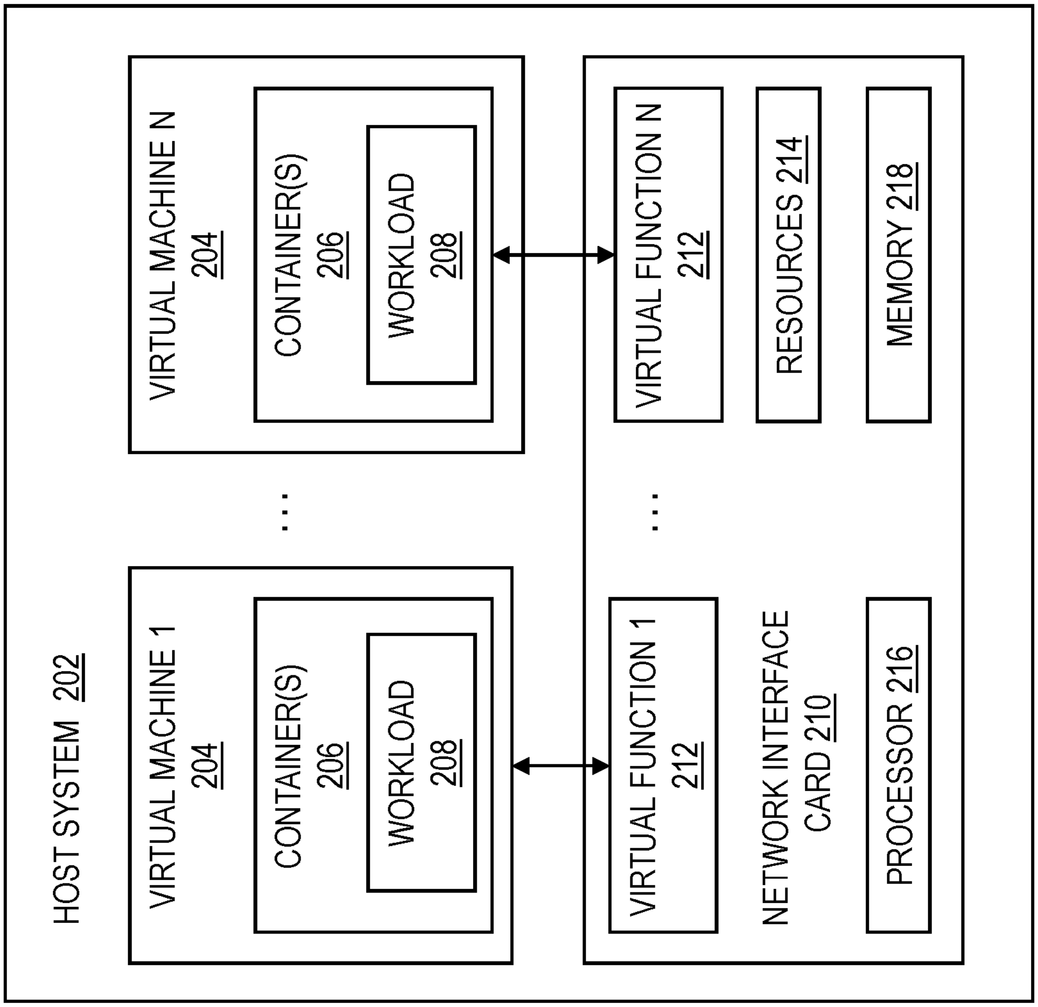
FIG. 2 is a block diagram of a host system including a network interface card having variable sized virtual functions in accordance with one or more embodiments of the present invention.

Referring now to FIG. 2, a block diagram of a host system 202 having a NIC 210 with variable sized virtual functions is shown. In exemplary embodiments, the host system 202 may be embodied in a computer 101 as shown in FIG. 1. As illustrated, the host system 202 includes a plurality of virtual machines 204 that each include one or more containers 206. Each container 206 is associated with at least one workload 208 that requires access to a network.

As shown, the host system 202 also includes a network interface card (NIC) 210. The NIC 210 also includes a plurality of virtual functions 212 that are each associated with a container 206 or a virtual machine 204. Each virtual function 212 functions as a virtual network interface card for the associated virtual machine 204 or container 206. The NIC 210 also includes a processor 216 and a memory 218. In exemplary embodiments, the processor 216 of the NIC 210 is configured to manage the operations of the virtual functions 212 and to allocate the resources 214 of the NIC 210 to the virtual functions 212. The resources 214 include buffer space of the NIC 210, transmission bandwidth of the NIC 210, and the like. In exemplary embodiments, at least two of the virtual functions 212 are configured to have a different size, that is the amount of resources 214 allocated to each of the virtual functions is non-uniform or not equal.

In one example, a NIC includes twenty-seven virtual functions wherein sixteen of the virtual functions are allocated one sixty-fourth of the resources of the NIC, eight of the virtual functions are allocated one thirty-second of the resources of the NIC, two of the virtual functions are allocated one-eighth of the resources of the NIC, and one of the virtual functions are allocated one-fourth of the resources of the NIC.

In exemplary embodiments, the amount of resources allocated to each workload of the plurality of virtual functions is based on a workload requirement associated with each workload. The workload requirement associated with each workload may be obtained from a connection request received from a corresponding workload. In one example, when a connection request is received from a workload, a workload requirement for the workload is obtained and a virtual function having an allocated amount of resources sufficient to accommodate the workload is associated with the workload.

In exemplary embodiments, the processor 216 of the NIC 210 is configured to monitor the resource consumption of each of the plurality of virtual functions and adjust the allocation of the set of resources among the plurality of virtual functions based at least in part on the resource consumption of each of the plurality of virtual functions. In one embodiment, adjusting the allocation of the set of resources among the plurality of virtual functions is further based on an amount of resources 214 that have not been allocated to other active virtual functions, i.e., virtual functions that have been associated with a workload. In another embodiment, adjusting the allocation of the set of resources among the plurality of virtual functions is further based on the amount of resources unused by the current virtual function.

In one embodiment, the processor 216 of the NIC 210 subdivides the resources 214 into a plurality of discrete units and allocates the resources 214 among the virtual functions by assigning one or more of the plurality of discrete units to each of the virtual functions. In one example, the processor 216 of the NIC 210 subdivides the resources 214 into sixty-four equally sized units and statically assigns each unit of resources to a virtual function. The processor 216 then dynamically bonds the units of resources together to form variable sized virtual functions, which each have a size that is a multiple of the 1/64th sized units. For example, one virtual function may be allocated eight units and would be allocated 1/8th of the resources 214 and another virtual function may be allocated sixteen units and would be allocated 1/4th of the resources 214. In exemplary embodiments, the number of units allocated to each virtual function can change over time as the usage of the virtual function, and other virtual functions change.

In exemplary embodiments, the use of equally sized fixed units that are selectively combined provides for a more efficient implementation and allows for hierarchical allocation of the units. For example, in one embodiment, a hypervisor may request a rather large virtual function, such as a virtual function requiring half of the resources 214. The request from the hypervisor may also include isolation policies that request that the virtual function be split among sub-virtual functions that are each assigned to separate workloads managed by the hypervisor.

Referring now to FIG. 3 a flowchart 300 of a method for operating a network interface card having variable sized virtual functions according to an embodiment is shown. The flowchart 300 is described in reference to FIGS. 1-2 and may include additional steps not depicted in FIG. 3. Although depicted in a particular order, the blocks depicted in FIG. 3 can be rearranged, subdivided, and/or combined. As shown at block 302, the method 300 includes receiving, by a network interface card, a connection request for a workload. In exemplary embodiments, the connection request can be received from a workload, a container associated with the workload or a virtual machine that includes the container or workload. Next, as shown at block 304, the method 300 includes obtaining, by the network interface card, a workload requirement based on the connection request. In one embodiment, the connection request includes a workload requirement that specifics a required bandwidth and buffer space needed by the workload. The method 300 also includes assigning, by the network interface card, a virtual function to the workload, where the size of the virtual function is based at least in part on the workload requirement as shown at block 306. In exemplary embodiments, the network interface card includes a set of resources and the size of the virtual function corresponds to an amount of the set of resources allocated to the virtual function.

In exemplary embodiments, assigning the virtual function to the workload includes selecting the virtual function from a plurality of virtual functions, wherein at least two of the plurality of virtual functions have unequal sizes. In one embodiment, the plurality of virtual functions includes a first group of virtual functions having a first size, a second group of virtual functions having a second size, a third group of virtual functions having a third size, and a fourth group of virtual functions having a fourth size, wherein the second size is twice the first size, the third size is twice the second size, and the fourth size is twice the third size.

Figure 4:
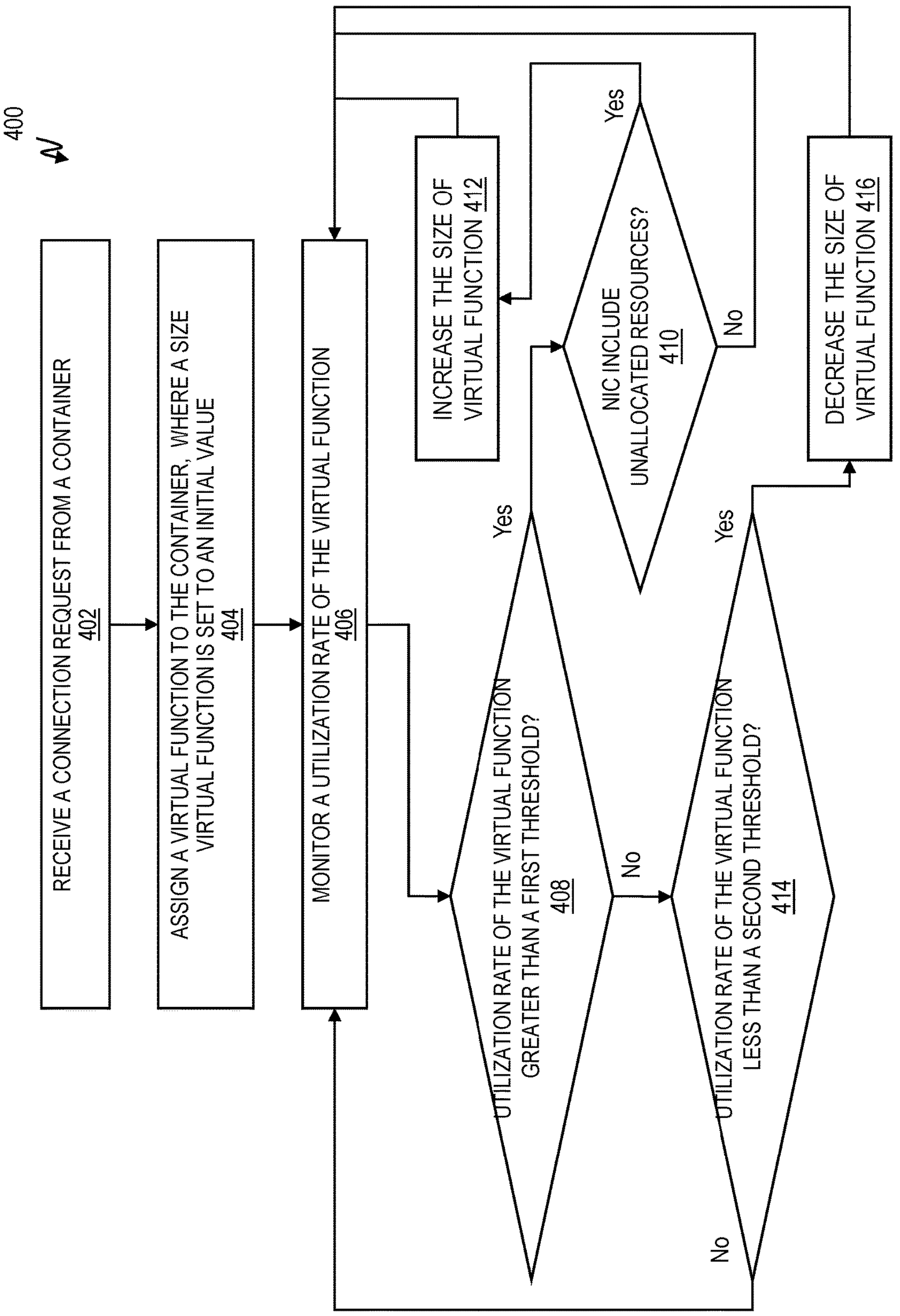
FIG. 4 is a flowchart of a method for operating a network interface card having variable sized virtual functions in accordance with one or more embodiments of the present invention.

Referring now to FIG. 4 a flowchart 400 of a method for operating a network interface card having variable sized virtual functions according to an embodiment is shown. The flowchart 400 is described in reference to FIGS. 1-2 and may include additional steps not depicted in FIG. 4. Although depicted in a particular order, the blocks depicted in FIG. 4 can be rearranged, subdivided, and/or combined. As shown at block 402, the method 400 includes receiving, by a network interface card, a connection request for a workload. Next, as shown at block 404, the method 400 includes assigning, by the network interface card, a virtual function to the workload, wherein a size of the virtual function is set to an initial value. In exemplary embodiments, the network interface card includes a set of resources and wherein the size of the virtual function corresponds to an amount of the set of resources allocated to the virtual function. The method 400 also includes monitoring, by the network interface card, a utilization rate of the virtual function, as shown at block 406. As used herein, the utilization rate of the virtual function is an average percentage of allocated resources that the virtual function is consuming during a specified time interval.

As shown at decision block 408, the method 400 includes determining whether the utilization rate of the virtual function is greater than a first threshold, i.e., is the virtual function using more than a predetermined amount of the resources allocated to it. In one embodiment, the first threshold is eighty percent. If the utilization rate of the virtual function is greater than the first threshold, the method 400 proceeds to decision block 410 and determines whether the NIC has unallocated resources. If the utilization rate of the virtual function is less than the first threshold, the method 400 proceeds to decision block 414 and determines whether the utilization rate of the virtual function is less than a second threshold, i.e., is the virtual function using less than a predetermined amount of the resources allocated to it. In one embodiment, the second threshold is twenty percent. Based on a determination to the utilization rate of the virtual function is less than the second threshold, the method 400 proceeds to block 416 and the size of the virtual function is decreased. Based on a determination to the utilization rate of the virtual function is greater than the first threshold and that the NIC includes unallocated resources, the method 400 proceeds to block 412 and increases the size of the virtual function. In exemplary embodiments, the network interface card includes a set of resources that are divided into a plurality of discrete units, and increasing/decreasing the size of the virtual function includes increasing/decreasing a number of the plurality of discrete units assigned to the virtual function.

In exemplary embodiments, a virtual memory paging methods are used to allocate memory space in a ring buffer of the NIC among the virtual functions. Since all memory access for each virtual function in the NIC are sequential access, high performance paging management can be achieved by configuring the processor to monitor head and tail registers to manage page prefetch and working set size. In one embodiment, the NIC uses dynamic mapping between shared, physical NIC resources and allocated virtual function resources. In one embodiment, there are two resources that can be managed the ring buffer slots which holds pointers to (or descriptors of) packet buffer space or pages. For example, the ring buffers can be made smaller or larger and the usage of the buffer is monitored (i.e., min/max/average slots in use out of the total number of entries in the ring buffer. Based on the slots in use, corresponding packet buffer memory can be reserved for each VF. For example, a ring buffer can have 1024 slots, but only 256 packet memory buffers. As long as the slots in use is within bounds (say 50-80% of the slots) this allocation can be maintained. However, if more slots are in use (e.g., >80%) more packet memory buffers can be allocated to the VF, which can be done without changing the total number of slots in the ring buffer. Additionally, the number of slots in the ring buffer can be increased or decreased so these resources can also be shifted to other VFs.

In exemplary embodiments, the NIC is configured to enforce the isolation of hierarchical virtual functions. For example, once a virtual machine allocates a virtual function to a workload, only that workload can access the virtual function. Accordingly, disparate treatment, such as encryption requirements, can be provided for different virtual function associated with the same virtual machine. For example, a single virtual machine may include multiple workloads that are allocated different virtual functions, which are only accessible by the assigned workload, even though the workloads are associated with the same virtual machine. In exemplary embodiments, a hypervisor associated with a first virtual machine may request a virtual function that is sub-divided into smaller virtual functions that are each allocated to workloads of the first virtual machine.

In exemplary embodiments, virtual functions may be combined or divided to provide virtual functions having a desired amount of resources, i.e., one virtual function can be split into two having half the resources of the original virtual functions or two virtual functions can be combined into one having the sum of the resources of the two virtual functions.

Although discussed primarily with reference to network interface cards, the methods and systems disclosed herein can also be applied to various other types of shared computing resources or computer peripherals. More specifically, the methods and systems can be applied to any shared computing resource that uses a ring-type buffer to control the flow of work that is submitted to/from the device. For example, any commonly virtualized device, such as a disk device or the like may be configured using the methods and systems disclosed herein. In one embodiment, a virtualization standard such as, virtio, can be used to provide dynamic resource allocation to support workloads with different requirements.

As used herein a workload can refer to a single application or a single process executing on a virtual machine, a virtual machine, or a combination of multiple virtual machines operating on a single computing system. In one embodiment, the workload on a specific virtual function may be a combination of workloads from several multiplexed clients.

Technical advantages and benefits include network interface cards that have increased performance and utilization by allowing dynamic resource allocation to support workloads with different network requirements.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A network interface card comprising:

a processor;

a set of resources; and a plurality of virtual functions, each virtual function configured to provide network access to a workload, wherein each virtual function functions as a virtual network interface card for the associated virtual machine and is allocated ring buffer slots and flow table entries of the NIC, wherein the processor is configured to allocate the set of resources among the plurality of virtual functions, and wherein the allocation of the set of resources is non-uniform across the plurality of virtual functions, wherein the set of resources includes ring buffer slots that hold pointers to packet buffer space or pages, and wherein the processor is configured to monitor head and tail registers to manage page prefetch and working set size and to change a number of slots in the ring buffer allocated to each virtual function based on slots in use.

2. The network interface card of claim 1, wherein an amount of the set of resources allocated to each workload of the plurality of virtual functions is based on a workload requirement associated with each workload.

3. The network interface card of claim 2, wherein the workload requirement associated with each workload is obtained from a connection request received from a corresponding workload.

4. The network interface card of claim 1, wherein the processor is further configured to:

monitor a resource consumption of each of the plurality of virtual functions, wherein the resource consumption includes a utilization of the ring buffer slots allocated to each virtual function; and adjust the allocation of the set of resources among the plurality of virtual functions based at least in part on the resource consumption of each of the plurality of virtual functions.

5. The network interface card of claim 4, wherein adjusting the allocation of the set of resources among the plurality of virtual functions is further based on one or more of an amount of unallocated resources of the set of resources and on a usage of resources among the plurality of virtual functions.

6. The network interface card of claim 1, wherein the set of resources includes one or more of a transmission buffer, a flow table entry, and a bandwidth of the network interface card.

7. The network interface card of claim 1, wherein the set of resources are divided into a plurality of discrete units and wherein allocation the set of resources among the plurality of virtual functions comprising assigning one or more of the plurality of discrete units to each of the plurality of virtual functions.

8. A computer-implemented method comprising:

receiving, by a network interface card, a connection request for a workload;

obtaining, by the network interface card, a workload requirement based on the connection request; and assigning, by the network interface card, a virtual function of the network interface card that is allocated ring buffer slots that hold pointers to packet buffer space and that is allocated flow table entries of the NIC to the workload, wherein a size of the virtual function is based at least in part on the workload requirement;

monitoring, by the network interface card, head and tail registers to manage page prefetch and working set size and to determine slots in use; and changing, by the network interface card, a number of slots in the ring buffer allocated to the virtual function based on the slots in use.

9. The computer-implemented method of claim 8, wherein the network interface card includes a set of resources and wherein the size of the virtual function corresponds to an amount of the set of resources allocated to the virtual function.

10. The computer-implemented method of claim 9, wherein the set of resources includes ring buffer slots, a transmission buffer, flow table entries, and a bandwidth of the network interface card.

11. The computer-implemented method of claim 8, wherein assigning the virtual function to the workload incudes selecting the virtual function from a plurality of virtual functions, wherein at least two of the plurality of virtual functions have unequal sizes.

12. The computer-implemented method of claim 11, wherein the plurality of virtual functions includes a first group of virtual functions having a first size, a second group of virtual functions having a second size, a third group of virtual functions having a third size, and a fourth group of virtual functions having a fourth size.

13. The computer-implemented method of claim 12, wherein the second size is twice the first size, the third size is twice the second size, and the fourth size is twice the third size.

14. A computer-implemented method comprising:

receiving, by a shared computing resource, a connection request for a workload, wherein the shared computing resource is a network interface card;

assigning, by the shared computing resource, a virtual function of the network interface card that is allocated ring buffer slots and flow table entries of the NIC to the workload, wherein a size of the virtual function is set to an initial value;

monitoring, by the shared computing resource, a utilization rate of one or more resources assigned to the virtual function;

changing the size of the virtual function based at least in part on a determination the utilization rate of the virtual function is outside of a threshold range, which is between a first threshold value and a second threshold value.

15. The computer-implemented method of claim 14, wherein the shared computing resource is a network interface card includes a set of resources and wherein the size of the virtual function corresponds to an amount of the set of resources allocated to the virtual function.

16. The computer-implemented method of claim 15, wherein the set of resources includes a transmission buffer and a bandwidth of the network interface card.

17. The computer-implemented method of claim 14, further comprising:

monitoring, by the shared computing resource, an amount of unallocated resources, wherein increasing the size of the virtual function is further based on the amount of unallocated resources.

18. The computer-implemented method of claim 14, wherein the shared computing resource includes a set of resources that are divided into a plurality of discrete units and wherein increasing the size of the virtual function comprises increasing a number of the plurality of discrete units assigned to the virtual function.

19. The computer-implemented method of claim 14, wherein changing the size of the virtual function includes decreasing the size of the virtual function based at least in part on a determination the utilization rate of the virtual function is less than the second threshold value.

20. The computer-implemented method of claim 19, wherein the shared computing resource includes a set of resources that are divided into a plurality of discrete units and wherein decreasing the size of the virtual function comprises decreasing a number of the plurality of discrete units assigned to the virtual function.

* * * * *